United States Patent
Melder

(10) Patent No.: US 12,162,438 B2
(45) Date of Patent: Dec. 10, 2024

(54) SUPPORT DEVICE

(71) Applicant: Dieter Melder, Türkheim (DE)

(72) Inventor: Dieter Melder, Türkheim (DE)

( * ) Notice: Subject to any disclaimer, the term of this patent is extended or adjusted under 35 U.S.C. 154(b) by 0 days.

(21) Appl. No.: 17/603,971

(22) PCT Filed: Mar. 13, 2020

(86) PCT No.: PCT/EP2020/056999
§ 371 (c)(1),
(2) Date: Oct. 15, 2021

(87) PCT Pub. No.: WO2020/212035
PCT Pub. Date: Oct. 22, 2020

(65) Prior Publication Data
US 2024/0208428 A1   Jun. 27, 2024

(30) Foreign Application Priority Data

Apr. 17, 2019 (EP) .................................... 19169948
Jun. 24, 2019 (EP) .................................... 19182113

(51) Int. Cl.
*B60R 9/06* (2006.01)
*B60R 11/00* (2006.01)

(52) U.S. Cl.
CPC ........... *B60R 9/06* (2013.01); *B60R 2011/005* (2013.01); *B60R 2011/0085* (2013.01)

(58) Field of Classification Search
CPC ....... B60R 9/06; B60R 9/08; B60R 2011/004; B60R 2011/0042
See application file for complete search history.

(56) References Cited

U.S. PATENT DOCUMENTS

| | | | | |
|---|---|---|---|---|
| 5,094,373 A | * | 3/1992 | Lovci | B62D 43/02 224/535 |
| 5,518,159 A | * | 5/1996 | DeGuevara | B60R 9/06 224/512 |
| 5,544,799 A | * | 8/1996 | Didlake | B60R 9/06 224/523 |
| 5,664,717 A | * | 9/1997 | Joder | B60R 9/06 224/532 |
| 6,237,823 B1 | * | 5/2001 | Stewart | B60R 9/065 224/523 |
| 6,659,318 B2 | * | 12/2003 | Newbill | B62D 43/02 224/512 |
| 6,701,913 B1 | * | 3/2004 | LeDuc | B60R 9/06 126/30 |
| 6,745,926 B2 | * | 6/2004 | Chimenti | B60R 9/06 224/924 |
| 7,281,646 B2 | * | 10/2007 | Flannery | B60R 9/06 224/512 |

(Continued)

FOREIGN PATENT DOCUMENTS

| | | |
|---|---|---|
| CA | 2 505 237 | 10/2006 |
| DE | 103 42 177 | 4/2005 |

(Continued)

*Primary Examiner* — Brian D Nash
(74) *Attorney, Agent, or Firm* — Bauer & Joseph

(57) ABSTRACT

The invention relates to a support device for securing a load to a vehicle, comprising guiding means, pivoting means and a support platform. The pivoting means are connected to the support platform such that the support platform can be pivoted about a vertical axis of the pivoting means.

20 Claims, 9 Drawing Sheets

(56) References Cited

U.S. PATENT DOCUMENTS

Figure 1A:
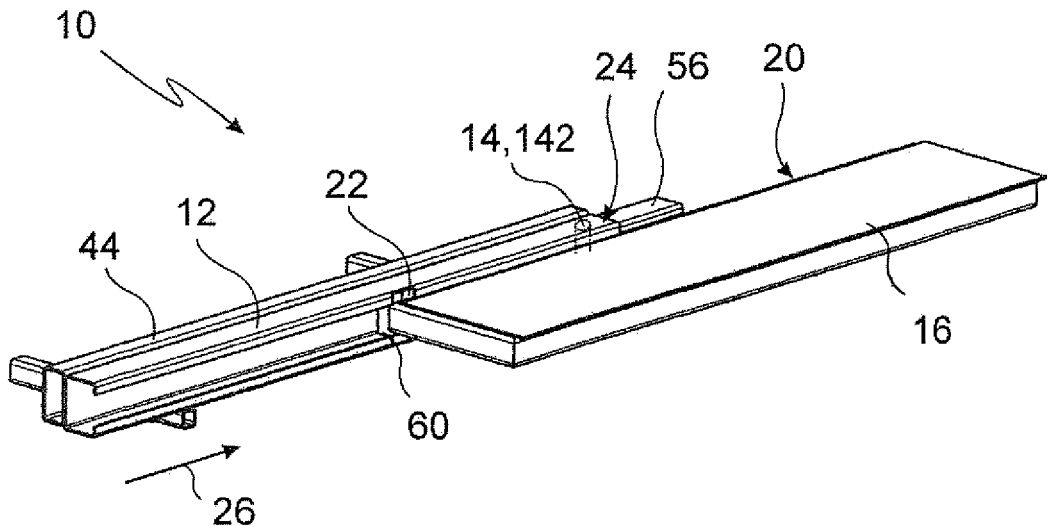

| | | | | |
|---|---|---|---|---|
| 10,328,862 B2* | 6/2019 | Eichmann | ................ | B60D 1/42 |
| 10,384,621 B2* | 8/2019 | Mehlen | .................... | B60R 9/10 |
| 10,661,845 B2* | 5/2020 | Wymore | ............. | B62D 43/002 |
| 11,702,014 B2* | 7/2023 | Wronski | ................... | B60R 9/06 |
| | | | | 224/509 |

FOREIGN PATENT DOCUMENTS

| | | |
|---|---|---|
| EP | 1 211 134 | 6/2002 |
| FR | 2 731 362 | 9/1996 |
| JP | 08-175276 | 7/1996 |

* cited by examiner

SUPPORT DEVICE

The invention relates to a carrier device for fastening a load to a vehicle, comprising a guide means, a pivot means and a supporting platform, wherein the pivot means is connected to the supporting platform such that the supporting platform can be pivoted about a vertical axis of the pivot means. The invention also relates to a vehicle having a carrier device.

Devices which are provided for the transport of loads, such as for example two-wheelers, on vehicles are known. In this case, the device is fastened to the vehicle. Such a device is usually attached to the rear end of a passenger car or of a bus, wherein a rear door for example in the form of a trunk lid is normally provided at the rear end of such vehicles. The rear door is blocked as a result of an arrangement of the device and/or load at the rear end. In order to be able to access the rear door, the supporting device/load has to be removed, which for example makes the operation inconvenient.

It is therefore an object of the present invention to provide a carrier device for at least one load, said carrier device avoiding the disadvantages of the prior art stated above.

To achieve this object, the combinations of features specified in the independent patent claims are proposed. Advantageous refinements and developments of the invention emerge from the dependent patent claims.

The dependency references given in the dependent claims relate to the development of the subject matter of the main claim by way of the features of the respective dependent claim. However, these should not be understood to be obviating the need to achieve independent substantive protection for the features of the appended dependent claims.

Possible features of the proposal are reproduced in structured form below. The features reproduced in structured form below can be combined with one another as desired and can be incorporated in any combination into the claims of the application. It is clear to a person skilled in the art that the invention already emerges from the subject matter having the fewest features. In particular, advantageous or possible refinements, but not the only possible refinements, of the invention are reproduced below.

According to the invention, what is proposed in order to attain the advantages which achieve the object is that the supporting platform can be pivoted about the pivot means in such a way that, in a first pivoting position of the supporting platform, the supporting platform is oriented substantially parallel to the guide means. In a second pivoting position, the supporting platform is oriented at an angle, in particular at a right angle, with respect to the guide means, wherein a first part of the supporting platform is arranged on the one side with respect to the guide means and a second part of the supporting platform is arranged on the second side with respect to the guide means. As a result, a carrier device is obtained, the supporting platform of which requires only a small amount of space in the pivoted-out state and also during the pivoting out to reach this state. In particular, the positioning of the supporting plate portions on a first and second side of the guide means allows the supporting plate to be oriented so as to project from the vehicle, to which the carrier device is attached, to a lesser extent than the carrier devices from the prior art.

The object according to the invention is furthermore achieved in that a guide element is provided on the supporting platform, said guide element being arranged on or in the guide means in a first pivoting position of the supporting platform and exiting out of the guide means in a second pivoting position. As a result, a positioning of the supporting plate that takes up less space is proposed. The main benefit of the invention is that by way of the invention neither the removal of the load from the carrier device nor the removal of the supporting device from the vehicle (for example the trailer coupling) is necessary in order to open the rear doors or tailgate of the vehicle. This increases the convenience and the operability considerably.

At the same time, the risk of damaging the load (for example a bicycle or a motorcycle) is reduced since said load is moved with the entire carrier device, that is to say is not moved separately, which may possibly lead to damage.

The result is that the load is pivoted to the side in a controlled manner by the carrier device and thus does not get in the way during a handling operation on the rear side of the vehicle. As a result, the rear region of the vehicle, for example the trunk, can be accessed quickly, and at the same time the load is in a secured state on the carrier device and does not hamper the loading and unloading activities on the rear side of the vehicle.

The invention combines a high level of convenience with a simple design, which is reliable in operation and cost-effective.

In a further embodiment, it is provided that the aforementioned feature ("A guide element is provided on the supporting platform, said guide element being arranged on or in the guide means in a first pivoting position of the supporting platform and exiting out of the guide means in a second pivoting position") is combined with the feature "The supporting platform can be pivoted about the pivot means in such a way that, in a first pivoting position of the supporting platform, the supporting platform is oriented substantially parallel to the guide means and, in a second pivoting position, the supporting platform is oriented at an angle, in particular at a right angle, with respect to the guide means, wherein a first part of the supporting platform is oriented on the one side with respect to the guide means and a second part of the supporting platform is oriented on the second side with respect to the guide means".

Furthermore, the proposal advantageously provides that the guide element is guided, and longitudinally displaceable, in the guide means in the first pivoting position of the supporting platform. The guide element can thus be conveyed smoothly into different positions. As a result, it is also possible to change the position of the load relative to the vehicle, which may possibly already be sufficient to provide accessibility for example at one part of the rear end of the vehicle.

It is advantageously provided that the supporting platform has a counter-guide in which the pivot means is guided in a longitudinally movable manner directly or indirectly by way of a foot piece. This makes it possible to extend and pivot the supporting platform in a telescope-like manner, such that only small movement paths of the supporting platform are achieved. The use of the counter-guide increases the displaceability, and thus also the spatial region in which the supporting platform can be moved and brought in order to free up the rear side of the vehicle.

Furthermore, it is expediently provided that the counter-guide is arranged on the supporting platform, in the first pivoting position, facing the guide means. It is thus possible for the guide means to be situated opposite the counter-guide, in order to allow the supporting plate to be extended in a telescope-like manner, wherein the foot piece and the guide element is simultaneously guided in the or on the counter-guide and the guide means, respectively.

In a further preferred embodiment, it is provided that the pivot means directly adjoins the foot piece. In this case, the pivot means and the foot piece may be of one-piece form. Alternatively, it is possible that the pivot means is spaced apart from the foot piece to some extent but nevertheless adjoins the latter for example by way of the second frame extension. Needless to say, the selection of the position of the pivot means relative to the foot piece makes it possible to select the respective geometrical relationships, that is to say the pivot range or pivot radius. In this respect, the invention can be implemented in a highly variable manner.

It is cleverly provided that a first frame extension is provided between the guide element and the supporting platform and/or a second frame extension is arranged between the pivot means and the foot piece. What is achieved by the arrangement of a first and/or second frame extension is that the supporting platform is remote from the guide means and thus wider articles can be received and transported using the carrier device according to the invention. By definition, the guide element is then also not arranged directly on the supporting platform but rather at that end of the first frame extension which faces away from the supporting platform.

The second and the first frame extension may have the same length and have the same structure with regard to a cross section relative to the longitudinal direction. The geometrical moments of inertia may also be the same or similar. The frame extensions can ensure that the carrier plate slides easily along the displacement direction.

In an advantageous refinement, it is provided that the guide element is arranged directly on the supporting platform. This ensures a robust and, at the same time, space-saving structure of the carrier device.

In a preferred refinement of the proposal, it is provided that the guide element can be fixed on or in the guide means in order to prevent pivoting. The fixing allows the supporting platform to be secured in a position desired by the user.

Advantageously, in a particular alternative, a first pivot means is arranged on the supporting platform, said first pivot means being connected by means of an articulated carrier to a second pivot means arranged on the guide element, and furthermore the supporting platform rests on a carrier and is displaceable relative thereto in accordance with the pivoting position, and the carrier is pivotably mounted on the guide means by means of a third pivot means. This advantageous design cleverly combines a high level of movability of the supporting platform with a high level of stability. The in total three joint regions permit highly articulated positioning, wherein the supporting platform resting on the carrier is not fixed on the carrier but is displaceable relative thereto, and is possibly also equipped with a separate guide.

In particular, it may be provided that the supporting platform has at least one guide which interacts with a guide element arranged on the carrier and thus permits displaceability of the supporting platform relative to the carrier, in particular in dependence on the pivoting position. Although the guide limits the movability of the supporting platform resting on the carrier to some extent, the operational reliability is also increased thereby since the guide naturally prevents undesired positions of the supporting platform relative to the carrier or to the other elements. The guide may be, for example, a bar, guide groove or rail, rectilinearly or possibly also along a curved path, on which a pin or bolt as guide element is guided, for example slides along.

Advantageously, at least two pivot means may be provided on one side of the supporting platform, wherein the at least two pivot means are arranged on the guide means. Two pivot means ensure a stable pivoting movement, with a high weight simultaneously acting on the supporting platform.

In particular, it is provided that the guide means has at least one removal opening, such that the guide element can be removed from the guide means through the removal opening. The position of the removal opening on the guide means defines the location of the pivot axis because the guide element is slid through the removal opening out of the guide means as a result of the pivoting of the supporting platform about this pivot axis. The selection of the location of the removal opening thus defines the position of the pivot range, possibly also of the pivot radius (for example a telescopic position on account of corresponding positive guidance). Where appropriate, a plurality of openings are also conceivable in order to achieve different pivoting positions. For example the location of the removal opening is also a possibility for setting the distance of the supporting platform from the vehicle side when the supporting platform is pivoted to the side.

In a particular development, it is provided that the supporting platform can be pivoted away from the guide means about the vertical axis of the pivot means at the longitudinal end of the guide means, while the guide element assigned to the supporting platform is removed at the removal opening as a result of the pivoting away from the guide means. During the pivoting-away operation, the guide element exits at the removal opening out of the guide means. In this case, the pivot means is stationary and the displaceability is effected on the counter-guide, in relation to which the supporting platform is movable. Here, it is provided that the guide element exits at the same point out of the removal opening and is not moved and displaced within the guide means. Another solution provides that the guide element is movable, and also displaced, within the guide means, and pivoting is self-evidently not possible in the regions where no removal opening is provided.

A locking mechanism may of course also be provided in order to avoid undesired pivoting of the guide means out of the guide element. For example, a fixing of the slide, which bears the guide means, in the guide element, for example by way of a plug bolt, is provided. This may also be an element which closes the removal opening.

In a further embodiment, it may be provided that the guide means has a cross section in order to engage around the guide element such that the guide element is guided in the guide means. In this way, the guide means is protected against external influences. The guide element is also arranged within the guide means in a manner which is safe for the user.

In an advantageous alternative form, it is provided that the guide element has a mount, the contour of which is adapted to the cross section of the guide means such that the guide element is guided on the guide means.

For the configuration and interaction of the guide means with the guide element, there are a plurality of variants, as just described. In the first variant, the guide means is configured to be larger than the guide element and encloses the latter. In the second variant, the guide element slides on a rail-like guide means, for which reason the guide element has a corresponding mount. There, the size ratios are then reversed.

Advantageously simple sliding in the guide means can be achieved if the guide means has a C-shaped or U-shaped cross section, in order to engage around the guide element. Corresponding C-shaped or U-shaped profiles are available in the prior art in a high level of variability and form a convenient but nevertheless stable basis for the implementation of the guide element in order to thus guide the guide means in a reliable manner.

It is advantageously provided that the guide means has the form of a rail, and the pivot means is displaceable along the guide means relative to the guide means, such that a compact construction for the carrier device can be achieved, which can at the same time be expanded or telescoped and pivoted.

It is cleverly provided that a counter-guide is arranged between the supporting platform and the guide means, and the supporting platform is preferably spaced apart from the guide means. An expansive load can be loaded onto such a supporting platform without the load coming into contact with the vehicle bearing the carrier device. Where appropriate, the supporting platform is linearly displaceable on the counter-guide. The orientation of the counter-guide relative to the guide means is parallel when the guide element has not been pivoted out of the guide means.

Furthermore, it is expediently provided that the second pivot means is attached to the supporting platform in a displaceable manner by means of a second frame extension. The frame extension ensures that there is a distance between the supporting platform and the guide means.

A further embodiment provides that the second frame extension is displaceable in the counter-guide in a horizontal direction, and the second pivot means cannot be displaced in the guide means. This ensures a defined and less expansive pivoting movement.

It is advantageously provided that the second pivot means is mounted on a slide and the slide is guided in the guide means in a movable manner, and the slide can be partially slid out of the guide means in such a way that the second pivot means is no longer surrounded by the guide means. A telescope-like design, which ensures a compact carrier device that is easy to handle, is also imparted to the carrier device by the slide. The telescoping capability may also allow a larger pivot range, and the supporting platform can thereby be moved or pivoted further away from the rear end.

Advantageously, the guide element can first of all exit at the removal opening of the guide means when the slide has been at least partially slid out of the guide means. This is particularly advantageous if large loads are loaded, since the supporting platform can be spaced apart from the vehicle.

In an expedient embodiment, the first and second pivot means may be arranged on or in the guide means in a non-displaceable manner, as a result of which a particularly robust embodiment is obtained.

An expedient development involves at least one strut extending transversely from the guide means in the opposite direction to the supporting platform, wherein the strut has a free end which can be connected to a part of a vehicle, with the result that a simple and nevertheless stable connection to the vehicle can be produced.

It is also advantageous for a mount for a trailer coupling of the vehicle to be arranged on the carrier device, preferably on the guide means. The mount for the trailer coupling makes it possible to produce an optimal connection to the vehicle.

The object according to the invention is in particular also achieved by a vehicle which is equipped with a carrier device which a guide means is attached in a horizontal direction along a rear end with a rear door, preferably along a bumper, of the vehicle, wherein a supporting platform can be pivoted by means of at least one pivot means, at least partially adjacent to the vehicle. As a result of the carrier device, a load can be easily attached to the outside of the vehicle and transported. Here, it is provided that the carrier device pivots the supporting platform (almost) completely adjacent to the vehicle, or for example 70, 50, 40, 30% or 20% of the length of the supporting platform in the pivoted state protrudes beyond the rear end. It is in particular provided that, owing to the use of the carrier device, the vehicle according to the invention is a great deal easier and more convenient to operate at the rear end, and in particular even relatively weak people, such as for example women, can load and unload the trunk without any difficulty when a corresponding load is transported.

It may cleverly be provided on the vehicle according to the invention that the guide means is a rail, preferably a U-shaped or C-shaped rail, in or on which the at least one pivot means and/or the guide element is/are arranged in a displaceable manner, wherein the at least one pivot means and/or the guide element, together with the supporting platform, can be displaced along the rail into a pivoting position.

A further embodiment provides, in the case of the vehicle according to the invention, that the vehicle has an attached trailer coupling which is used to connect the carrier device to the vehicle. The carrier device can be arranged on the trailer coupling such that heavy loads can be positioned on the supporting platform of the carrier device.

Particularly clever is an embodiment in which the vehicle has at least one supporting beam which interacts with the strut of the carrier device, for example can be slid into and fastened to said strut, as a result of which a particularly stable connection to the vehicle can be produced.

Figure 1B:
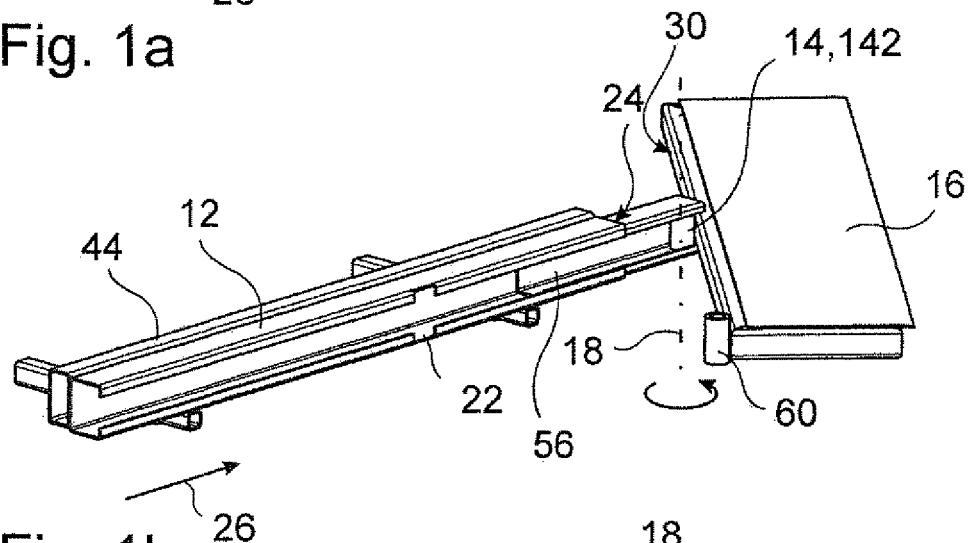
Figure 1C:
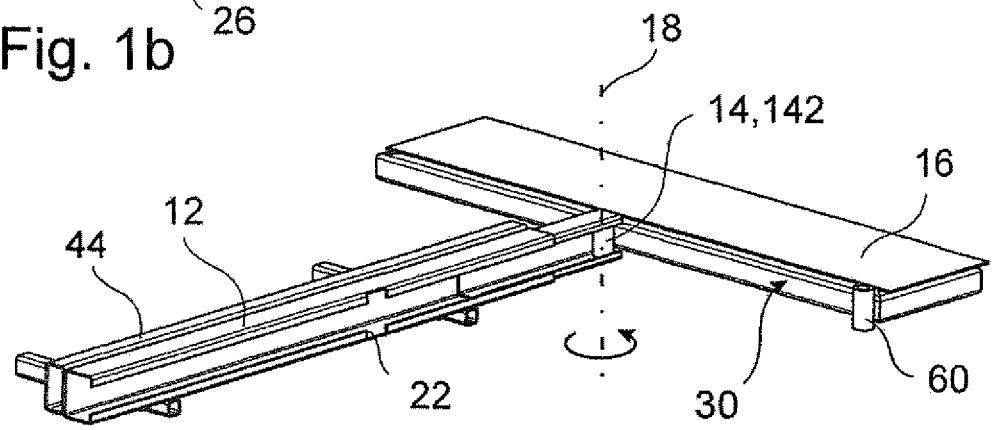
Figure 2A:
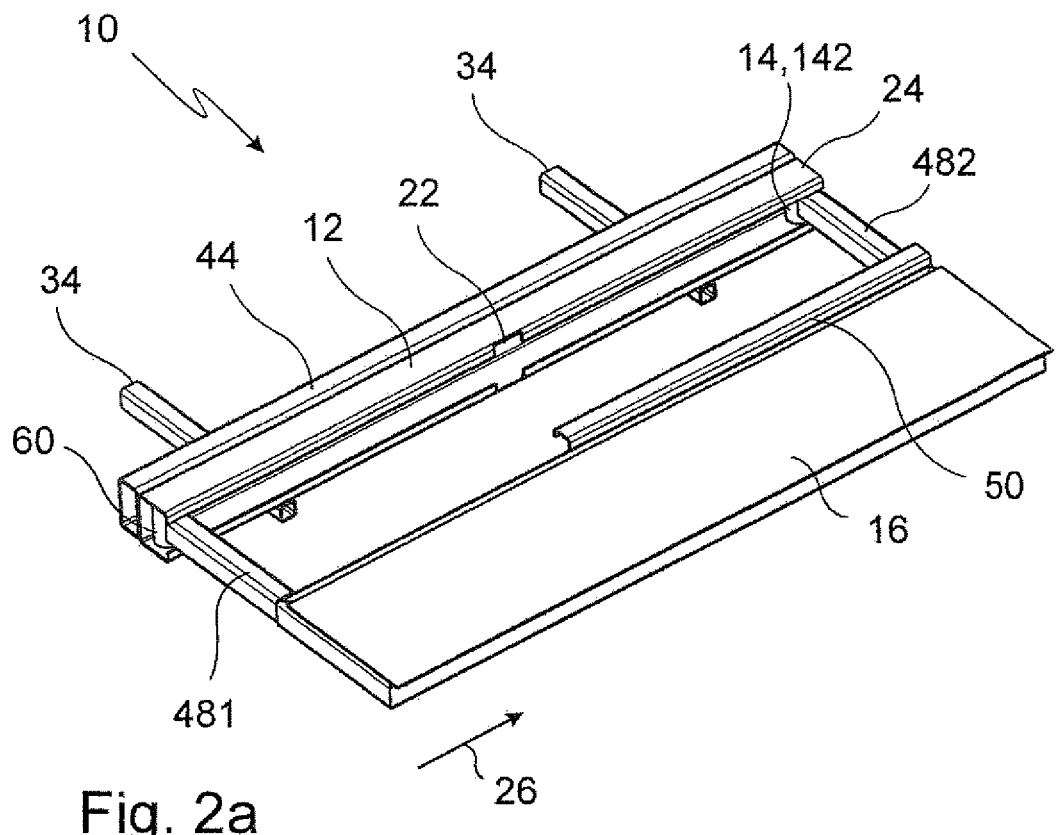
Figure 2B:
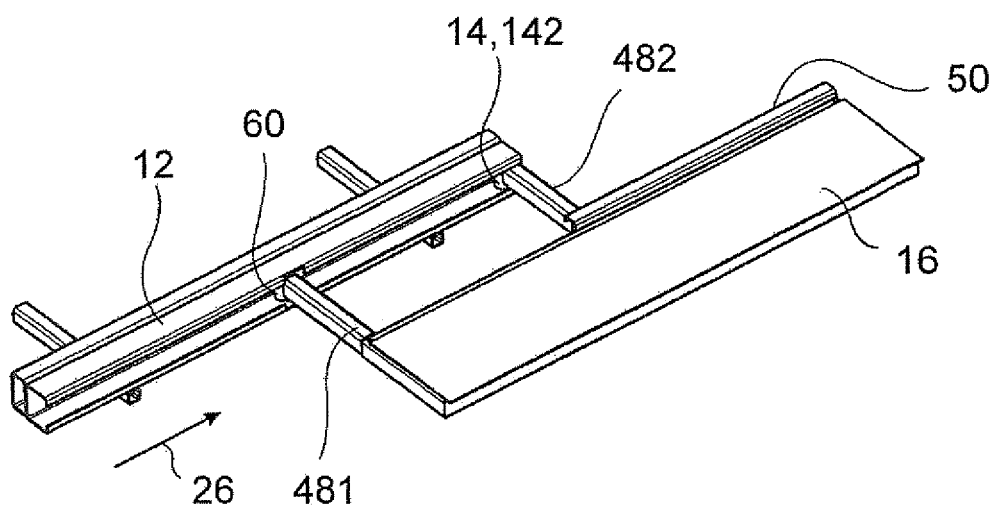
Figure 2C:
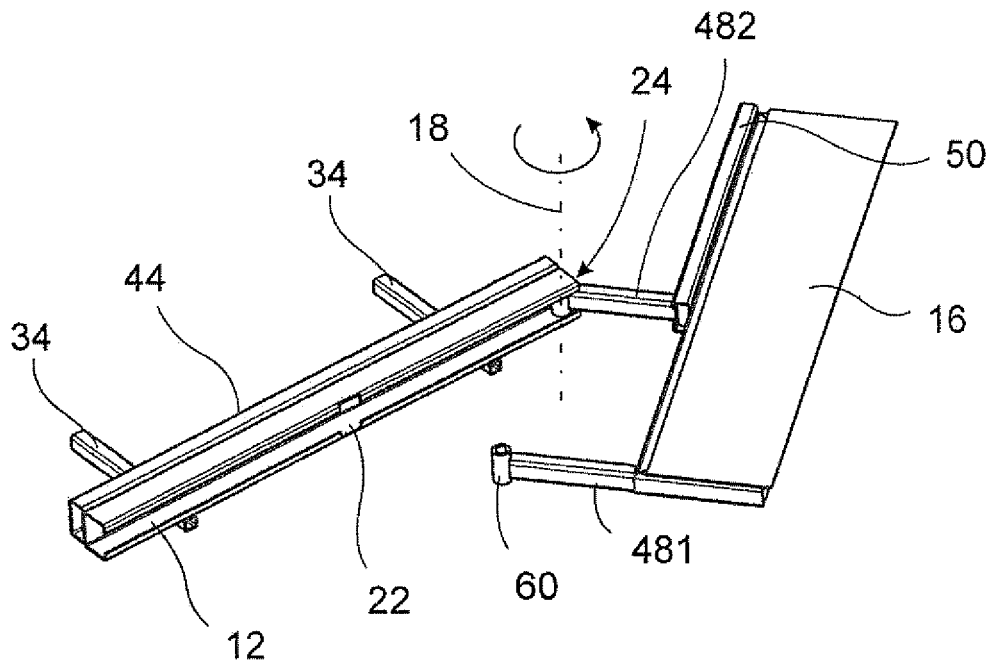
Figure 2D:
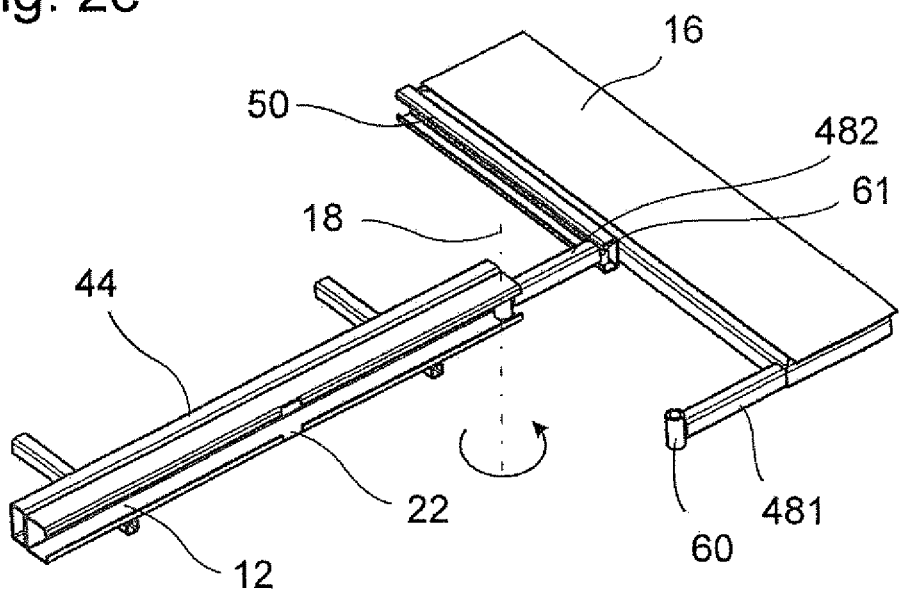
Figure 3A:
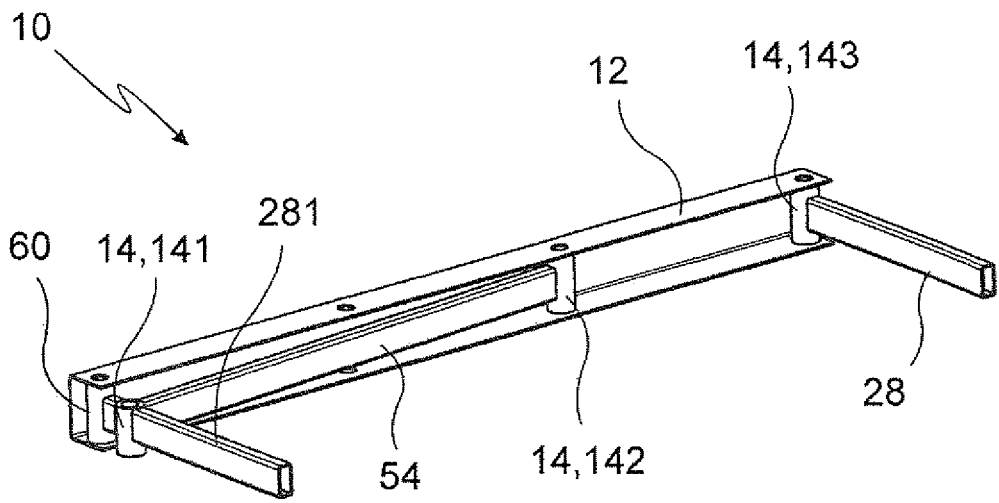
Figure 3B:
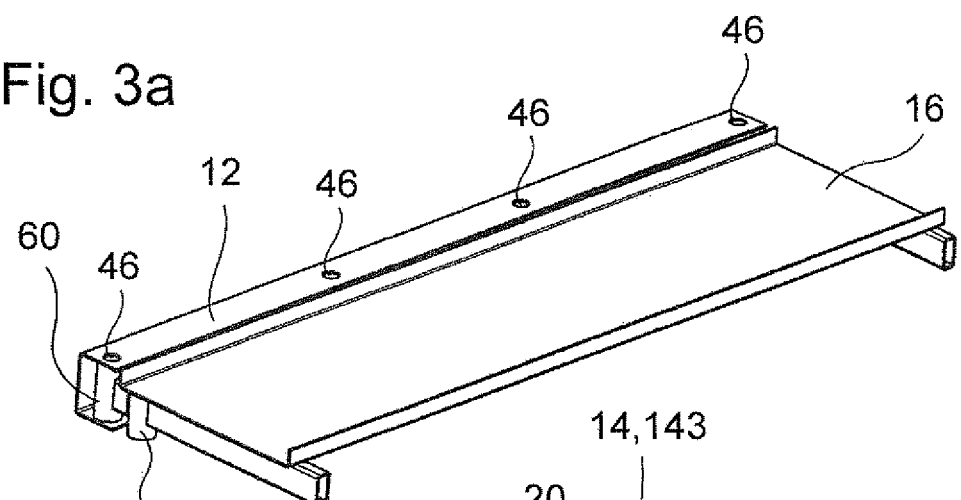
Figure 3C:
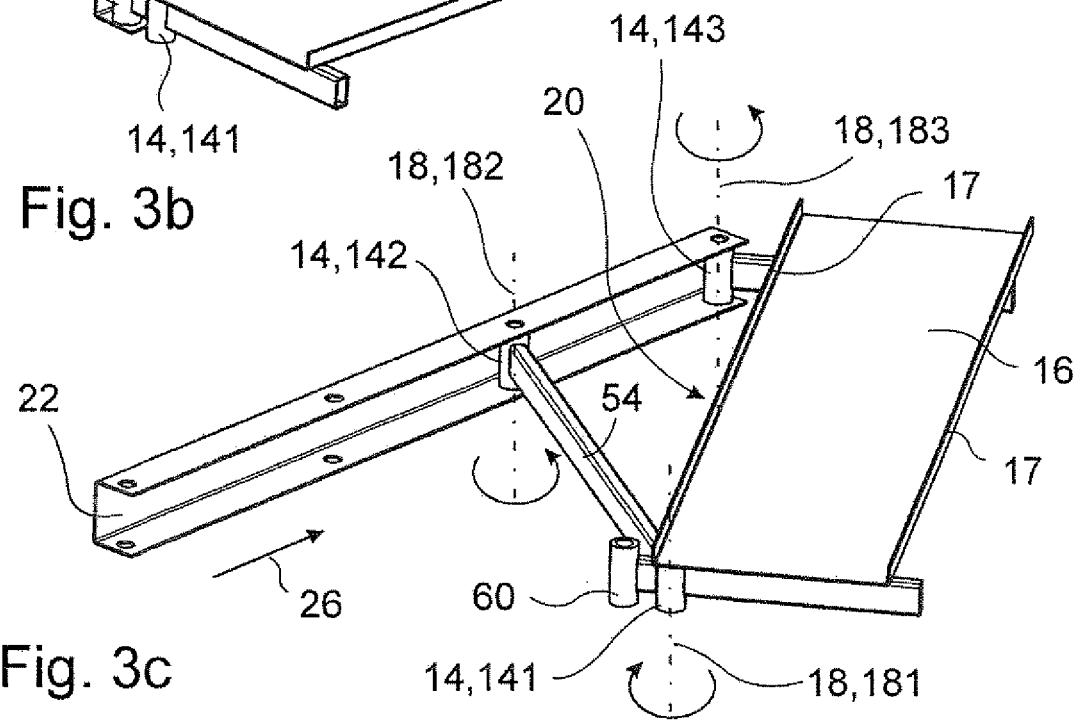
Figure 3D:
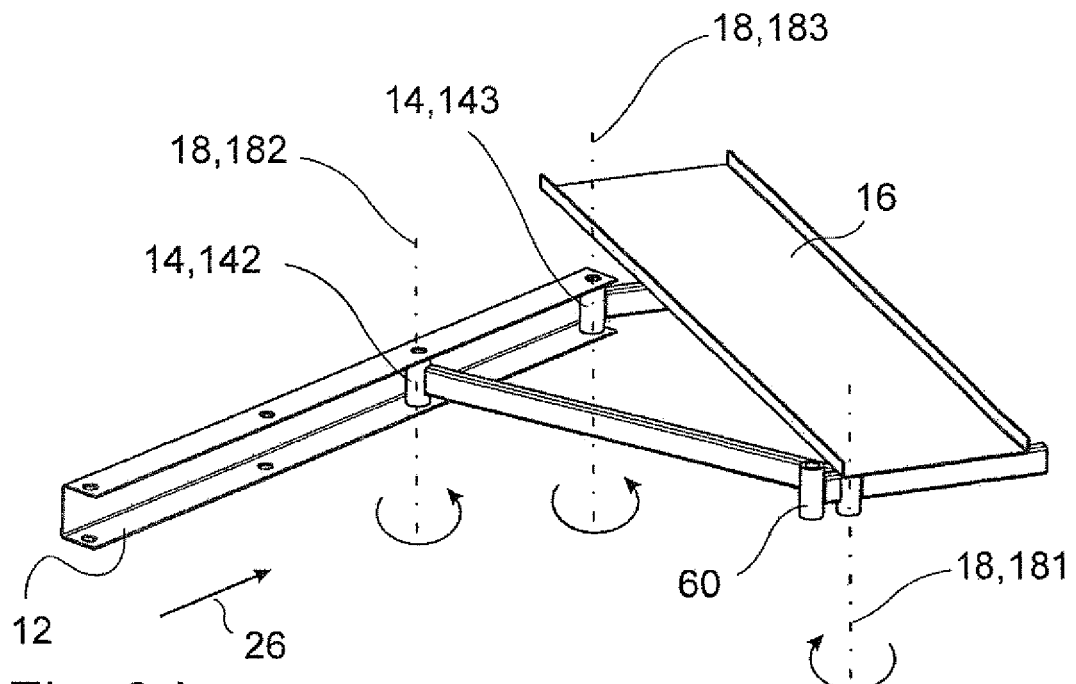
Figure 3E:
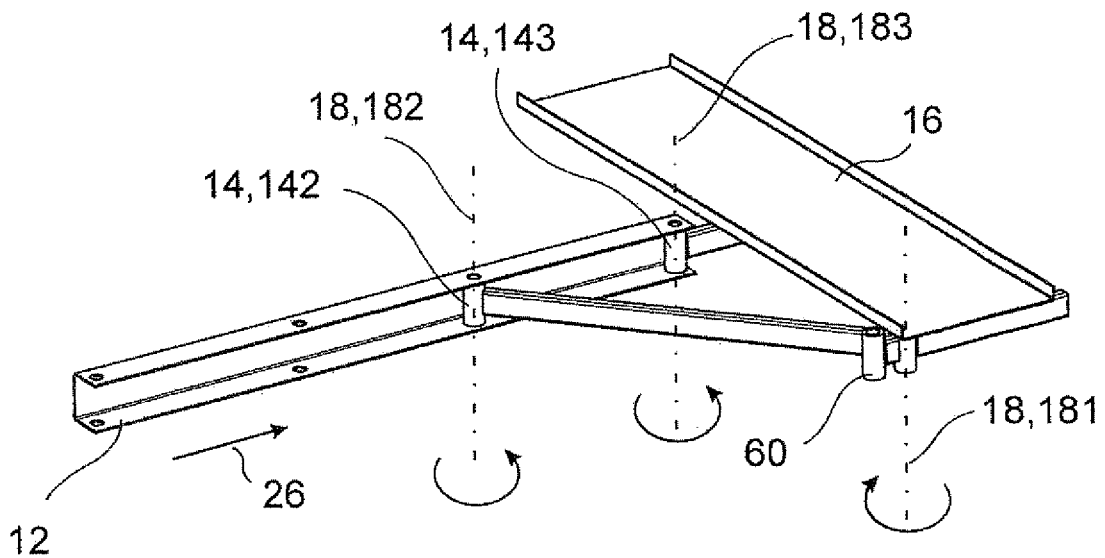
Figure 4A:
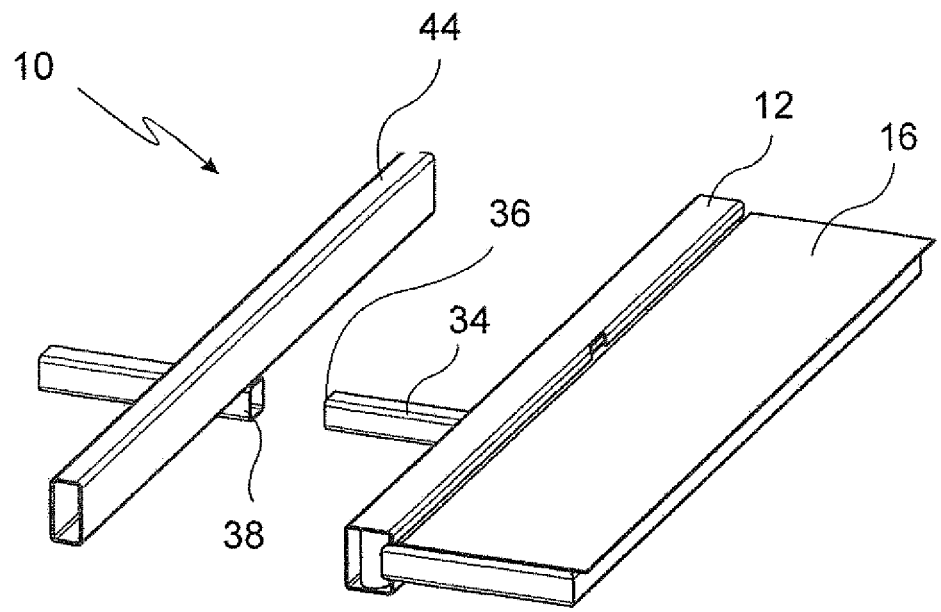
Figure 4B:
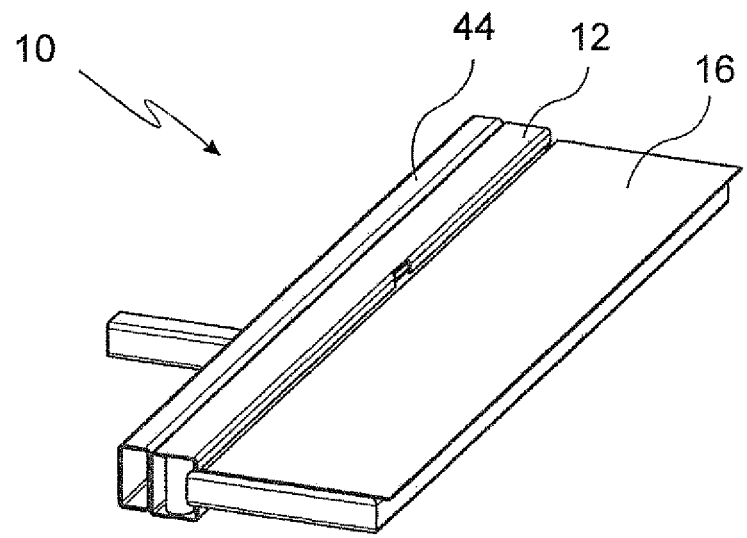
Figure 5A:
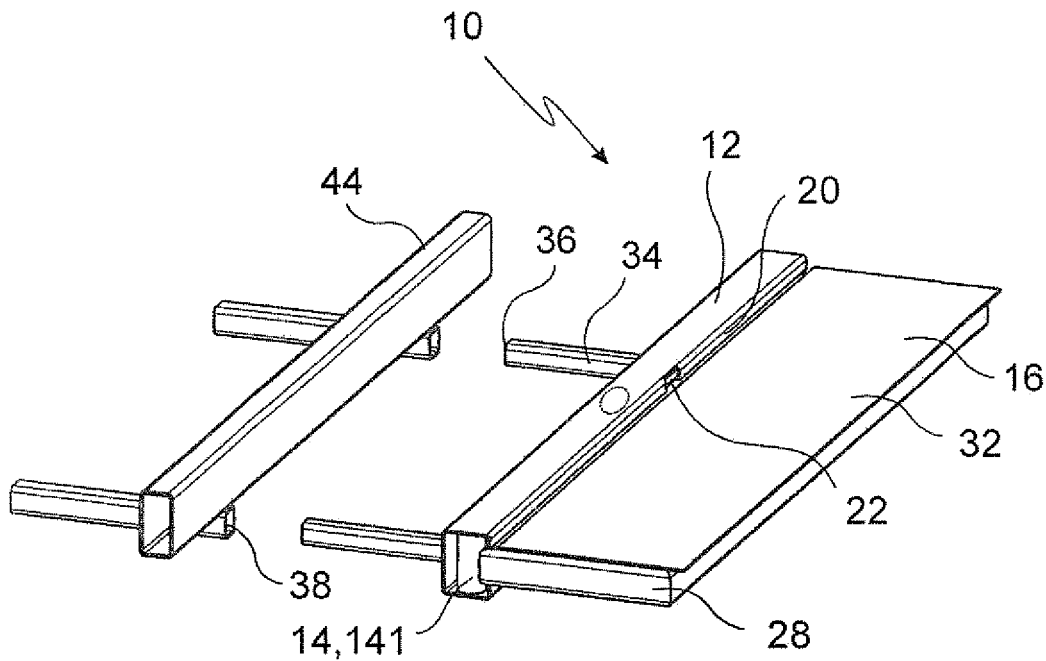
Figure 5B:
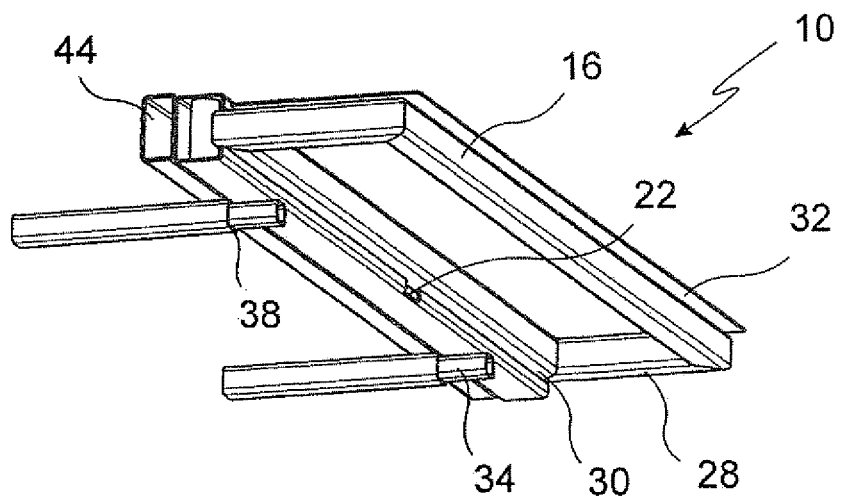
Figure 6:
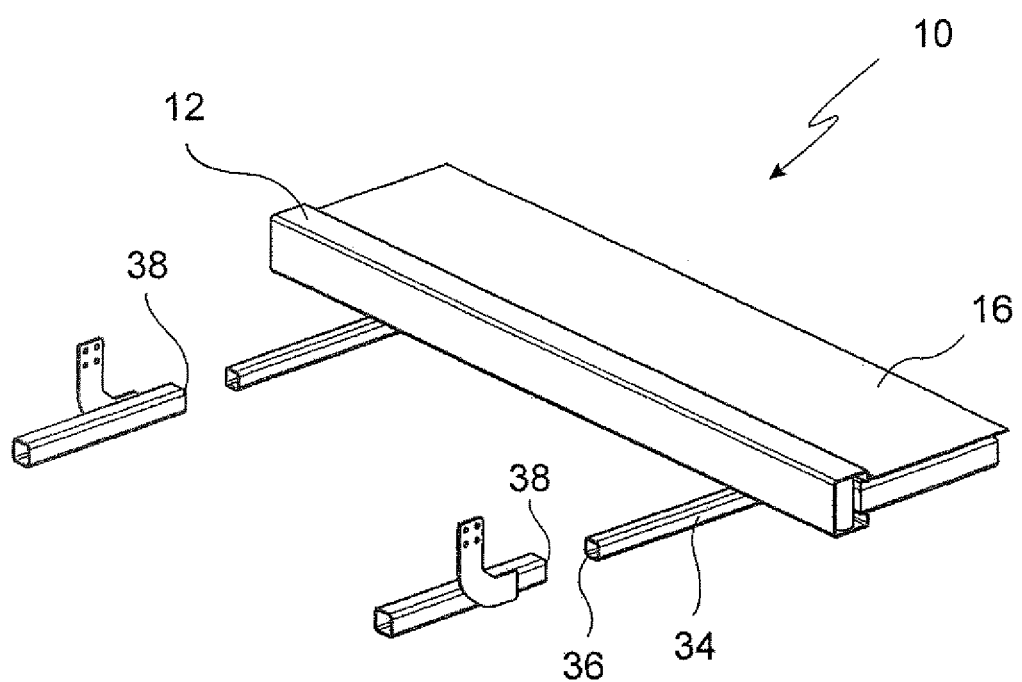
Figure 7A:
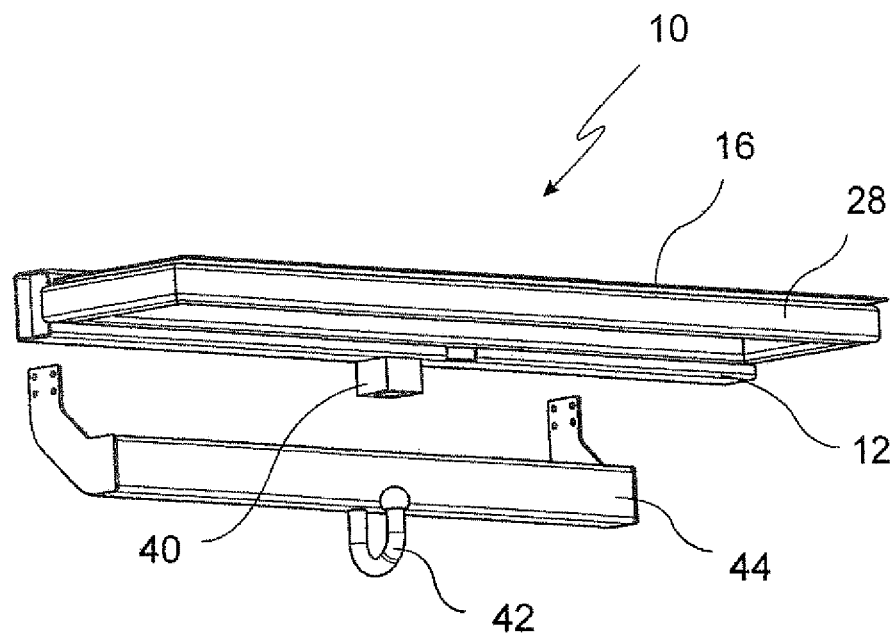
Figure 7B:
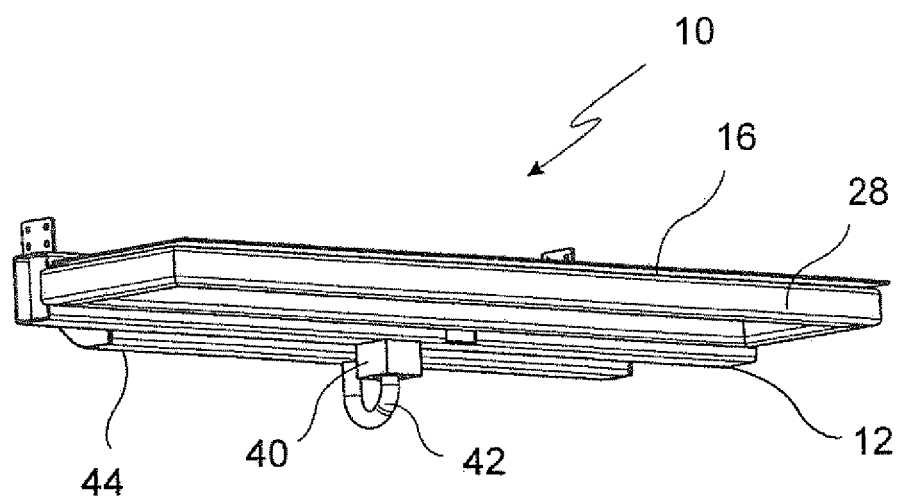

The invention is schematically illustrated, in particular in various exemplary embodiments, in the figures, in which:

FIGS. 1a, 1b, 1c each show a three-dimensional of a carrier device according to the invention according to a first exemplary embodiment with a slide which can be extended out of a guide means in a telescope-like manner, FIGS. 2a, 2b, 2c, 2d show a carrier device according to the invention according to a further exemplary embodiment in which a supporting platform, which is attached to a guide means by means of frame extensions, can be pivoted out, FIGS. 3a, 3b, 3c, 3d, 3e show a carrier device according to the invention according to a further exemplary embodiment which provides an articulated carrier for a pivoting movement, FIGS. 4a, 4b show a connection between a supporting beam on a bumper and a strut, which is complementary thereto, on the carrier device according to the invention, FIGS. 5a, 5b show a further example of the connection between the supporting beam and the strut in duplicate on a carrier device according to the invention, FIG. 6 shows an alternative connection of the carrier device to fastening tabs on the supporting beams according to the invention, and FIGS. 7a, 7b show a further alternative connection of the carrier device to the vehicle, wherein the carrier device can be arranged, by way of a mount, on a trailer coupling, according to the invention.

In the figures, identical or mutually corresponding elements are each denoted by the same reference signs and are therefore not described again, unless this is expedient. What is disclosed throughout the description can be transferred analogously to identical parts having the same reference signs or the same component descriptions. It is also the case that the positional information selected in the description, e.g. above/top, below/bottom, lateral, etc., relates to the figure directly described and illustrated and, in the case of the position being changed, can be transferred analogously to the new position. Furthermore, it is also possible for individual features or combinations of features from the different exemplary embodiments shown and described to constitute independent or inventive solutions or solutions according to the invention.

FIG. 1a discloses a carrier device 10 for fastening a load to a vehicle. Here, the carrier device 10 comprises a guide means 12, a pivot means 14 and a supporting platform 16, wherein the pivot means 14 is connected to the supporting platform 16. The pivot means 14, which faces an axial end 24 of the guide means 12 and about which the supporting platform is pivoted, is also referred to as second pivot means 142 in the text which follows.

Preferably, the supporting platform 16 is rectangular and comprises a plate 32 which is arranged on a frame-like structure. The guide means 12 is of elongate form and attached by way of a side facing away from the supporting platform 16 to a bumper 44 of a vehicle. The vehicle is not depicted in the figures. The supporting platform 16 is displaced along the longitudinal direction of the guide means 12.

The supporting platform 16 can be pivoted about a vertical axis 18 of the pivot means 14 such that the supporting platform is preferably oriented perpendicularly to the axis 18. The supporting platform 16 also extends in a plane which is oriented perpendicularly to the axis 18. The supporting platform 16 can be pivoted along the plane which is perpendicular to the axis 18. The connection between the supporting platform 16 and the pivot means 14 is rigid, with the result that a pivot axis 18 of the pivot means 14 cannot be tilted in relation to the surface of the supporting platform 16.

The supporting platform 16 is also displaced along the guide means in a horizontal direction 26 and brought into a position in which the supporting platform can be pivoted.

A guide element 60 is attached, in particular rigidly, to the supporting platform 16, said guide element being arranged on or in the guide means 12 in a first pivoting position of the supporting platform 16. In particular, the guide element 60 is attached to a longitudinal side 30 of the frame-like structure. The guide element 60 is preferably arranged directly on the supporting platform 16 and/or on the longitudinal side 30 of the frame-like structure.

During the movement of the supporting platform 16 along the guide means 12, the guide element 60 slides in or on the guide means 12 and ensures that the supporting platform 16 is oriented parallel to the guide means 12. Here, the longitudinal side 30 of the frame-like structure of the supporting platform 16 is oriented parallel to the guide means 12.

Preferably, the guide element 60 is guided in the guide means 12 to reach the first pivoting position of the supporting platform 16, wherein said guide element is engaged around by the guide means and is at the same time longitudinally displaceable along the guide means 12 in the horizontal direction 26. The horizontal direction 26 is perpendicular to the direction of gravity.

In the region of the axial end 24 of the guide means 12, a slide 56 is arranged in or on the guide means 12. The slide 56 is guided in the guide means 12 in a movable manner, wherein the slide 56 can in this way be partially slid out of the guide means 12, at least with respect to its longitudinal direction. The slide 56 may protrude at the axial end 24 of the guide means 12 after the sliding-out operation. In this case, the pivot means 14 may be conveyed, together with the slide 56, out of the guide means 12, with the result that the pivot means 14 is no longer surrounded by the guide means 12 or attached to the guide means 12. The pivot means 14 is in the terminal first pivoting position in the axial end 24 of the slide 56, said axial end being distal to the guide means 12.

For the pivoting of the supporting platform 16 about the pivot means 14, the supporting platform 16 is brought into a first pivoting position which is oriented substantially parallel to the guide means 12. To this end, the supporting platform 16 is conveyed into the region of an axial end 24 of the guide means 12. Here, in particular the pivot means 14 is positioned in the region of the axial end 24.

During the pivoting movement, as shown in FIG. 1b, the guide element 60 exits out of the guide means 12. The guide element 60 thus moves away from the guide means 12 as a result of the pivoting. In the case of a guide means 12 which engages around the guide element 60, a removal opening 22 is provided in the guide means 12, the guide element 60 being able to exit through said removal opening. The removal opening 22 is formed on the longitudinal side of the guide means 12 and faces the supporting platform.

During the pivoting out of the supporting platform 16, the guide element 60 first of all exits at the removal opening 22 of the guide means 12 when the slide 56 has been at least partially slid out of the guide means 12. During the pivoting-out operation, the second pivot means 142 is preferably positioned in the slide 56.

In a particularly preferred alternative, the guide means 12 has a cross section which engages around the guide element 60. The guide means 12 surrounds the guide element 60 in such a way that a weight force of a load on the supporting platform is supported by the guide means 12. The guide element 60 is also guided in the guide means 12. The guide element 60 slides in the guide means 12. Equally, the slide 56 be engaged around by the guide means 12. Alternatively, the slide 56 may engage around the guide means 12.

In order to be able to guide the guide element 60 in the guide means 12 with as little play as possible and nevertheless with a satisfactory sliding action, the guide element 60 is configured to be complementary to the guide means 12. To this end, the guide element 60 has a contour which is adapted to the cross section of the guide means 12 such that the guide element 60 is guided on the guide means 12.

The cross section of the guide means 12 is in particular C-shaped or U-shaped here, wherein the guide element 60 is engaged around by the guide means 12. The guide means 12 thus has the form of a rail. The pivot means 14 and the guide element 60 are displaceable along the guide means 12 in order to be conveyed into the first, or out of the first, pivoting position. The elongate opening of the profile of the guide means 12 is directed in the direction of the supporting platform 16.

The supporting platform 16 can be brought into a second pivoting position as per FIG. 1c, which is oriented at an angle, in particular at a right angle, with respect to the guide means 12. The second pivoting position can be reached from the first pivoting position, wherein pivoting is performed about the axis 18 of the pivot means 14. Equally, as a result of pivoting about the axis 18, the supporting platform 16 can be brought from the second to the first pivoting position. A first part of the supporting platform 16 is oriented on the one side with respect to the guide means 12 and a second part of the supporting platform 16 is oriented on the second, in particular opposite, side with respect to the guide means 12. Finally, the longitudinal side 30 of the frame is oriented transversely to the guide means 12.

For the pivoting from the first pivoting position (FIG. 1a) to the second pivoting position (FIG. 1c), the supporting platform 16 is first of all slid along the guide means 12 in the horizontal direction 26 until the second pivot means reaches the region of the longitudinal axial end 24 of the guide means 12 or, if a slide 56 is provided on the guide means 56, is positioned at the distal axial end thereof. The guide element 60 is thereby positioned at the removal opening 22. During the pivoting away (FIG. 1b) of the supporting platform 16 about the vertical axis 18 of the pivot means 14, 142 at the longitudinal axial end 24 of the guide means 12, the guide element 60 is removed from the guide means 12 through the removal opening 22. In the second pivoting position, the supporting platform 16 is positioned adjacent to the bumper 44 and thus also adjacent to the vehicle, with the result that a tailgate of the vehicle is accessible if the carrier device 10 is attached to the rear bumper 44.

FIG. 2a shows a further embodiment which has, as in FIGS. 1a to 1c, a guide rail 12 which is attached to a bumper 44. The guide means 12 is also of elongate form and has a U-shaped or C-shaped cross section, in which the guide element 60 slides.

Arranged on the supporting platform 16 is a counter-guide 50 which extends along the longitudinal side 30 of the supporting platform 16. In particular, the counter-guide extends approximately as far as half the supporting platform 16.

In the first pivoting position and during the sliding movement into the first pivoting position (FIGS. 2a and 2b), the counter-guide 50 faces the guide means 12. The counter-guide is thereby parallel to the guide means 12.

A first frame extension 481 is provided between the guide element 60 and the supporting platform 16. The first frame extension 481 is rigidly attached to the supporting platform 16 and extends in particular perpendicularly in the direction of the guide means 12.

In addition, a second frame extension 482 is arranged between the pivot means 14 and a foot piece 61 which slides in the counter-guide. The frame extensions 481, 482, which are preferably the same length, have the effect that the supporting platform 16 is oriented parallel to the guide rail 12. The supporting platform 16 is also spaced apart by the frame extensions 481, 482.

FIG. 2b shows a supporting platform 16 which has been displaced into the first pivoting position. In this case, the supporting platform 16 has been displaced to such an extent that the counter-guide 50 is arranged adjacent to the guide means 12. The frame extension 481, which is rigidly attached to the supporting platform 16, is moved along with the sliding movement, wherein the guide element 60 is positioned at the removal opening in the first pivoting position.

The second frame extension 482 is displaceable in the counter-guide 50 in the horizontal direction 26, wherein the foot piece 61 slides in the guide means 12. It is also the case that the second pivot means 142 cannot be displaced in the guide means 12. Said second pivot means can only be rotated about the vertical axis 18.

In this way, during a displacement from the starting position (FIG. 2a) to the first pivoting position (FIG. 2b), the first frame extension 481 which is rigidly attached to the carrier device 16 is displaced in the guide means 12 in the horizontal direction 26, while the pivot means 142 is positioned in a fixed manner, and for this purpose the foot piece 61 of the second frame extension 482 is displaced in the counter-guide simultaneously with the guide element 60. The second frame extension 481 is thereby positioned on the middle region of the supporting platform 16 at an end of the counter-guide 50. The frame extensions 481, 482 protrude through the elongate opening of the profile of the guide means 12.

During the pivoting movement about the vertical axis 18, as per FIG. 2c, the guide element 60 is pivoted through the removal opening 22, in particular as in FIG. 1b, out of the guide means 12. In this case, the pivot radius of the supporting platform is increased by the second frame extension, with the result that the supporting platform is spaced apart from the guide means 12 during the pivoting movement.

FIG. 2d discloses the carrier device 10 in the second pivoting position, wherein the supporting platform 16 is spaced apart from the guide means 12. In the second pivoting position, the supporting platform 16 is perpendicular to the bumper 44 and to the guide means 12.

FIG. 3a illustrates a further alternative embodiment of the carrier device 10, in which a first pivot means 14, 141 is arranged on the supporting platform 16, said first pivot means being connected by means of an articulated carrier 54 to a second pivot means 14, 142 arranged on the guide element 12. Both pivot means 141, 142 can be rotated about respective vertical axes 18. In this case, the second pivot means 142 is rotatably fastened with a fastening means through a hole 46 in the guide rail 12. In this case, the guide rail 12 is in particular of U-shaped form.

Furthermore, the plate 32 of the supporting platform 16 rests on a carrier 28, wherein said plate is displaceable relative to said carrier, in accordance with the pivoting position. The carrier 28 is mounted on the guide means 12 by means of a third pivot means 14, 143 so as to be able to pivot about a vertical axis 18, with the result that the supporting platform 16 can be pivoted. The third pivot means 143 is fastened through a hole 46 in the guide means 12.

The third pivot means 143 is arranged at the axial end 24, while the second pivot means 142 is positioned approximately centrally in the guide means 12. The guide element 60 is pivoted in and out at an end of the guide means 12 that is situated opposite the third pivot means 143, wherein the guide element 60 is attached to the articulated carrier 54. In this case, the first pivot means 14 is positioned between the guide element 60 and the articulated carrier 54. Said first pivot means may be fixed there on or in the guide means 12 in order to prevent pivoting. For fixing of the guide element 60, a hole 46 is provided in the guide means 12, through which hole a fastening means can be plugged into a hole in the guide element 60.

In all the embodiments, the pivot means 141, 142, 143 may be joints which have a degree of freedom in the plane of the pivoting movement.

At least two pivot means 14, 142, 143 are provided on one side 20 of the supporting platform 16, wherein the at least two pivot means 14, 142, 143 are arranged on the guide means 12. In particular, the first and third pivot means 141, 143 are arranged on or in the guide means 12 in a non-displaceable but rotatable manner.

FIG. 3b shows the carrier device 10 in a starting position, when the supporting platform 16 is fixed with the guide element 60 in the guide means 12. In this case, the articulated carrier 54 is recessed in the guide means 12. The carrier 28 is also approximately perpendicular to the guide means 12.

FIG. 3c shows the supporting platform 16 during the pivoting movement to reach a position adjacent to the bumper 44. In this case, the pivot means 141, 142, 143 are rotated about their respective vertical axis 181, 182, 183 and thus pivot out the supporting platform 16. The articulated carrier 54 and the carrier 28 thereby change their angles with respect to the guide means 12 and with respect to the supporting platform 16. Longitudinally running turned-up edges 17 bound the supporting platform 16.

FIG. 3*d* discloses the supporting platform 16 shortly before it has assumed its second pivoting position. In this case, the angles enclosed by the carrier 28 and the articulated carrier 54 have undergone a further change as a result of a rotation of the pivot means 14 about the vertical axes 18.

FIG. 3*e* illustrates the carrier device 10 in the second pivoting position, wherein the supporting platform 16 is positioned approximately perpendicularly to the guide means 12. Moreover, the carrier 28 is aligned with the guide means 12 and the articulated carrier 54 encloses an acute angle with the guide means 12, said acute angle being open in the direction of the supporting platform 16.

For fastening of the carrier device 10, as per FIG. 4*a*, a supporting beam 38 is arranged on the bumper of the vehicle, said supporting beam being oriented substantially perpendicularly to the bumper. The supporting beam 38 is hollow and has an opening which points in the direction of the supporting platform 16. Arranged on the rear side of the guide means 12 is a strut 34 which extends transversely from the guide means 12 in the opposite direction to the supporting platform 16. The strut 34 has a free end 36 which is plugged into the supporting beam 38 through the opening thereof.

As a result, the rear side of the guide means 12 is arranged along the horizontal direction 26 on the bumper 44, as is shown in FIG. 4*b*. The connection between the supporting beam 38 and the strut 34 constitutes a support arrangement which acts counter to the weight force of the load on the supporting platform 16 and the carrier device 10.

FIG. 5*a* contains an embodiment with two struts 34 which are slid into two supporting beams 38. In this case, both struts 34 and both supporting beams 38 are parallel to one another.

FIG. 5*b* shows the supporting platform from below, wherein the frame runs around at the periphery of the plate 32 and supports the plate 32. In this case, the guide means 12 is arranged along the bumper 44.

An alternative fastening possibility is shown in FIG. 6, wherein two supporting beams 38 are fastened on the left-hand side and on the right-hand side to the vehicle, preferably to the frame of the vehicle, by means of tabs which extend vertically upward. In this case, the tabs preferably have holes for fastening by means of fastening means such as screws. The tabs are of approximately L-shaped form.

FIG. 7*a* shows a further alternative for fastening of the carrier device 10, wherein the carrier device is about to be placed on a trailer coupling 42. To this end, a mount 40 for the trailer coupling 42 of the vehicle is arranged on the carrier device 10, preferably on the guide means 12. The mount is arranged approximately centrally on the lower side in particular of the guide means, and the trailer coupling can be plugged into the mount 40. In this case, the trailer coupling 42 is attached to the bumper 44.

In FIG. 7*b*, the carrier device 10 is placed on in such a way that the guide means 12 is positioned along the bumper 44.

Should it be found here upon closer examination, in particular also of the relevant prior art, that one feature or another, although advantageous, is not absolutely imperative in relation to the aim of the invention, then, of course, the attempt will be made to achieve a wording which no longer has such a feature, in particular in the main claim. Such a sub-combination is also covered by the disclosure of this application.

It should also be noted that the refinements and variants of the invention which are described in the various embodiments and which are shown in the figures can be combined in any desired manner with one another. It is possible here for individual features, or a number of features, to be interchanged as desired. These combinations of features are likewise disclosed here.

Features which have been disclosed only in the description, or also individual features from claims which comprise a number of features, can at any time be adopted in the independent claims as being of importance which is essential to the invention for the purpose of distinguishing the invention from the prior art, to be precise even when such features have been mentioned in conjunction with other features or achieve particularly advantageous results in conjunction with other features.

The claims which are filed at this point with the application and those claims filed later are without prejudice for the purpose of achieving further protection.

The invention claimed is:

1. A carrier device for fastening a load to a vehicle, comprising a guide means (12), at least one pivot means (14) and a supporting platform (16), wherein the at least one pivot means (14) is connected to the supporting platform (16) such that the supporting platform (16) can be pivoted about a vertical axis (18) of the pivot means (14), wherein the supporting platform (16) can be pivoted about the pivot means (14) in such a way that, in a first pivoting position of the supporting platform (16), the supporting platform (16) is oriented substantially parallel to the guide means (12) and, in a second pivoting position, the supporting platform (16) is oriented at an angle, in particular at a right angle, with respect to the guide means (12), and wherein the guide means (12) has a first side and an opposite second side, and wherein in the second pivoting position a first part of the supporting platform (16) is arranged on the first side of the guide means (12) and a second part of the supporting platform (16) is arranged on the second side of the guide means (12).

2. The carrier device as claimed in claim 1, wherein a guide element (60) is provided on the supporting platform (16), said guide element being arranged on or in the guide means (12) in the first pivoting position of the supporting platform (16) and exiting out of the guide means (12) in the second pivoting position.

3. The carrier device as claimed in claim 1, wherein the guide element (60) is guided, and longitudinally displaceable, in the guide means (12) in the first pivoting position of the supporting platform (16), and/or the guide element (60) can be fixed on or in the guide means (12) in order to prevent pivoting.

4. The carrier device as claimed in claim 1, wherein the supporting platform (16) has a counter-guide (50) in which the at least one pivot means (14) is guided in a longitudinally movable manner directly or indirectly by way of a foot piece (61), wherein the counter-guide (50) is arranged on the supporting platform (16), in the first pivoting position, facing the guide means (12).

5. The carrier device as claimed in claim 1, wherein the at least one pivot means (14) directly adjoins a foot piece (61) and/or a second frame extension (482) is arranged between the at least one pivot means (14) and the foot piece (61) and/or at least two pivot means (14, 142, 143) are provided on one side (20) of the supporting platform (16), wherein the at least two pivot means (14, 142, 143) are arranged on the guide means (12).

6. The carrier device as claimed in claim 1, wherein a first pivot means (14, 141) is arranged on the supporting platform (16), said first pivot means being connected by means of an articulated carrier (54) to a second pivot means (14, 142) arranged on the guide element (12), and furthermore the supporting platform (16) rests on a carrier (28) and is displaceable relative thereto in accordance with the pivoting position, and the carrier (28) is pivotably mounted on the guide means (12) by means of a third pivot means (14, 143).

7. The carrier device as claimed in claim 1, wherein the guide means (12) has at least one removal opening (22), such that the guide element (60) can be removed from the guide means (12) through the removal opening (22), and/or the guide means (12) has a C-shaped or U-shaped cross section in order to engage around the guide element (60).

8. The carrier device as claimed in claim 1, wherein the supporting platform (16) can be pivoted away from the guide means (12) about the vertical axis (18) of the at least one pivot means (14, 142) at the longitudinal end (24) of the guide means (12), while the guide element (60) assigned to the supporting platform (16) is removed at a removal opening (22) as a result of pivoting away from the guide means (12), and/or a counter-guide (50) is arranged between the supporting platform (16) and the guide means (12).

9. The carrier device as claimed in claim 8, wherein the supporting platform (16) is spaced apart from the guide means (12).

10. The carrier device as claimed in claim 1, wherein the guide means (12) has a cross section in order to engage around the guide element (60) such that the guide element (60) is guided in the guide means (12), and/or the guide element (60) has a mount, the contour of which is adapted to the cross section of the guide means (12) such that the guide element (60) is guided on the guide means (12).

11. The carrier device as claimed in claim 1, wherein a second pivot means (142) is attached to the supporting platform (16) in a displaceable manner by means of a second frame extension (482).

12. The carrier device as claimed in claim 1, wherein a second frame extension (482) is displaceable in a counter-guide (50) in a horizontal direction (26), and a second pivot means (142) cannot be displaced in the guide means (12), and/or the second pivot means (142) is mounted on a slide (56) and the slide (56) is guided in the guide means (12) in a movable manner, and the slide (56) can be partially slid out of the guide means (12) in such a way that the second pivot means (142) is no longer surrounded by the guide means (12).

13. The carrier device as claimed in claim 1, wherein a guide element (60) first of all exits at a removal opening (22) of the guide means (12) when a slide (56) has been at least partially slid out of the guide means (12), and/or first and second pivot means (14, 141, 142) are arranged on or in the guide means (12) in a non-displaceable manner.

14. The carrier device as claimed in claim 1, wherein at least one strut (34) extends transversely from the guide means (12) in an opposite direction to the supporting platform (16), wherein the at least one strut (34) has a free end (36) which can be connected to a part of a vehicle, and/or a mount (40) for a trailer coupling (42) of the vehicle is arranged on the carrier device (10).

15. The carrier device as claimed in claim 14, wherein the mount (40) arranged on the guide means (12).

16. A vehicle having a carrier device, preferably as claimed in claim 1, wherein the guide means (12) is attached in a substantially horizontal direction (26) along a rear end with a rear door of the vehicle, and wherein the supporting platform (16) can be pivoted by means of the at least one pivot means (14), such that one of the first or second parts of the supporting platform that is oriented substantially parallel to the guide means is at least partially adjacent to the vehicle.

17. The vehicle as claimed in claim 16, wherein the guide means (12) is a rail, in or on which the at least one pivot means (14) and/or the guide element (60) is/are arranged in a displaceable manner, wherein the at least one pivot means (14) and/or the guide element (60), together with the supporting platform (16), can be displaced along the rail into a pivoting position, and/or the vehicle has an attached trailer coupling (42) which is used to connect the carrier device (10) to the vehicle, and/or the vehicle has at least one supporting beam (38) which interacts with the strut (34) of the carrier device (10).

18. The vehicle as claimed in claim 17, wherein the rail is a U-shaped or C-shaped rail.

19. The vehicle as claimed in claim 17, wherein at least one supporting beam (38) is slid into and fastened to the at least one strut.

20. The vehicle as claimed in claim 16, wherein the wherein the guide means (12) is attached in a substantially horizontal direction (26) along a bumper (44) of the vehicle.

* * * * *